(12) United States Patent
Pfeiffer

(10) Patent No.: US 6,843,633 B2
(45) Date of Patent: Jan. 18, 2005

(54) SYSTEM AND APPARATUS FOR FILLING CONTAINERS WITH BULK PARTICULATE MATERIALS

(75) Inventor: John W. Pfeiffer, Hughesville, PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

(21) Appl. No.: 10/751,474

(22) Filed: Jan. 6, 2004

(65) Prior Publication Data

US 2004/0141817 A1 Jul. 22, 2004

Related U.S. Application Data

(62) Division of application No. 10/223,383, filed on Aug. 20, 2002, now Pat. No. 6,739,358.

(51) Int. Cl.$^7$ ................................................ B65G 1/00
(52) U.S. Cl. .......................... 414/304; 414/397; 406/89
(58) Field of Search ............................... 406/46, 89, 90, 406/91, 93, 94, 95, 138; 414/328, 327, 304; 193/15, 16, 17, 22; 141/10, 312

(56) References Cited

U.S. PATENT DOCUMENTS

| 760,015 | A | * | 5/1904 | Parker | 193/22 |
|---|---|---|---|---|---|
| 1,814,618 | A | * | 7/1931 | Carter | 193/3 |
| 1,918,133 | A | * | 7/1933 | Rennels | 406/116 |
| 4,972,940 | A | * | 11/1990 | Gleason | 198/588 |
| 4,979,604 | A | * | 12/1990 | Forsberg | 193/22 |
| 5,259,425 | A | * | 11/1993 | Johnson et al. | 141/12 |
| 5,518,048 | A | * | 5/1996 | Derby | 141/80 |
| 6,776,197 | B1 | * | 8/2004 | DeCrane | 141/10 |

* cited by examiner

Primary Examiner—Joe Dillon, Jr.
(74) Attorney, Agent, or Firm—Stevens, Davis, Miller & Mosher, LLP

(57) ABSTRACT

A particulate material conveying apparatus generally consisting of an upper conduit having a material receiving inlet; a first intermediate conduit communicating with the upper conduit and swivable relative to the upper conduit about a first axis; a second intermediate conduit communicating with the first intermediate conduit and swivelable relative to the first intermediate conduit about a second axis parallel to the first axis; a lower conduit having a material discharge outlet, communicating with the second intermediate conduit and swivable relative to the second intermediate conduit about a third axis parallel to the second axis; and a mechanism for translating the angular displacement of the second intermediate conduit relative to the first intermediate conduit about the second axis to angular displacement of the first intermediate conduit relative to the upper conduit about the first axis.

24 Claims, 3 Drawing Sheets

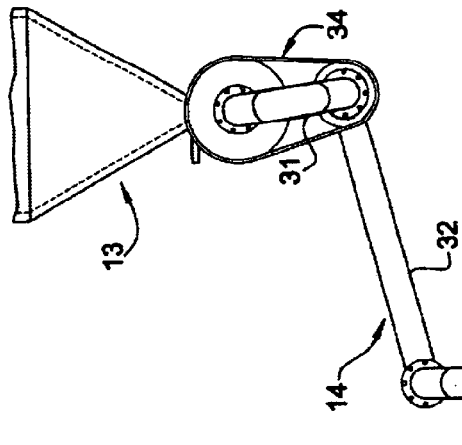
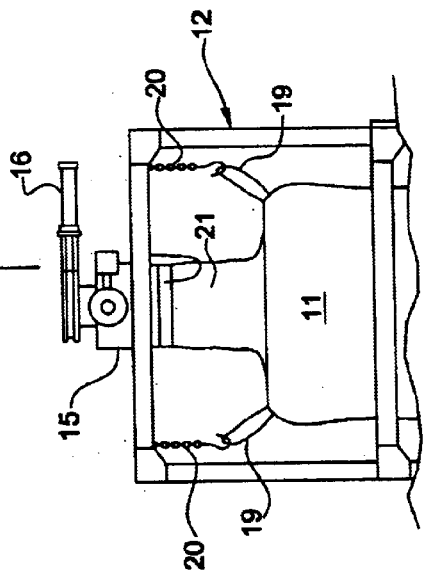
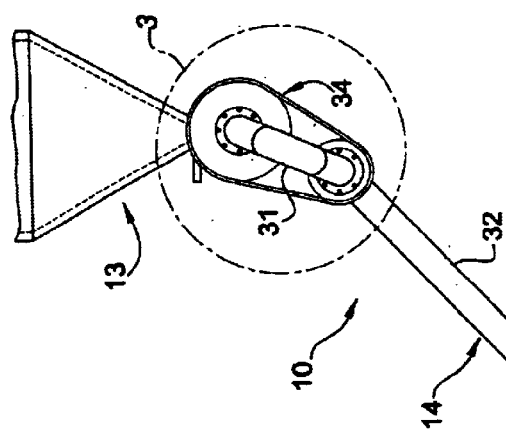
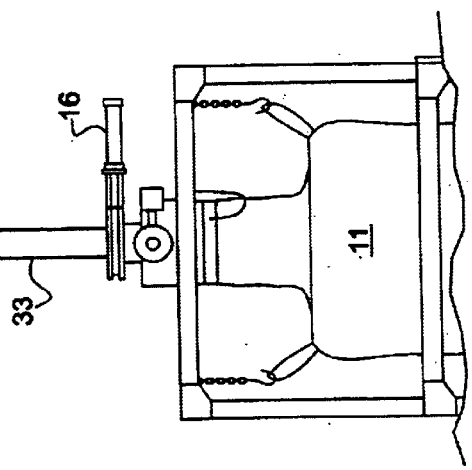
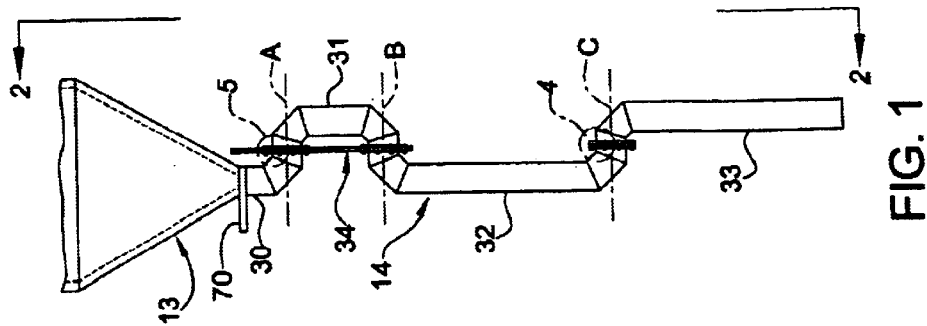

SYSTEM AND APPARATUS FOR FILLING CONTAINERS WITH BULK PARTICULATE MATERIALS

This application is a divisional application of U.S. patent application Ser. No. 10/223,383 filed Aug. 20, 2002, now U.S. Pat. No. 6,739,358.

This invention relates to the handling of bulk particulate materials and more particularly to filling containers of such materials. The invention further contemplates a system and apparatus for filling containers of such materials while preventing the escape of dust into the ambient atmosphere.

BACKGROUND OF THE INVENTION

In many industries, it often is required to fill containers with bulk particulate materials for transporting, storing and otherwise handling such materials. Where such materials consist of fine particles such as with titanium oxide, much dust is created when filling such containers, particularly if such materials are pneumatically conveyed. Often, such materials are stored or otherwise maintained in elevated bins and merely gravity fed into containers through the use of various conduits. Whether such materials are gravity fed or force fed, dust is created which results in a possibly hazardous condition, a pollution of the ambient atmosphere, a health problem for operators and a loss of material. Filter systems may be used in certain applications for capturing such dust particles but such equipment adds to the capital investment and operating cost of an operation. Accordingly, it is the principal object of the present invention to provide a system and apparatus for filling containers such as bags with bulk particulate materials of a fine consistency in which the creation of dust is greatly reduced if not entirely eliminated without the use of filter equipment. It is a further object of the present invention to provide such system and apparatus functional to gravity feed a fine, bulk particulate material from an elevated bin by gravity flow without the loss of material in the form of dust to the ambient atmosphere.

SUMMARY OF THE INVENTION

The present invention provides an apparatus for filling a container with a bulk particulate material consisting of fine particles with a minimum of loss of such particles to the ambient atmosphere, generally consisting of an upper conduit having a material receiving inlet communicable with an elevated supply of material to be fed into the container, a first intermediate conduit communicating with the upper conduit and swivelable relative to the upper conduit about a first axis, a second intermediate conduit communicating with the first intermediate conduit and swivelable relative to the first intermediate conduit about a second axis parallel to the first axis, a lower conduit having a material discharge outlet, communicating with the second intermediate conduit and swivelable relative to the second intermediate conduit about a third axis parallel to the second axis and means for translating the angular displacement of the lower conduit relative to the second intermediate conduit about the third axis to angular displacement of the first intermediate conduit relative to the upper conduit about the first axis. Such assembly of components allows the lower conduit to be disposed and displaced vertically thus permitting such lower conduit to be inserted into an upwardly opening inlet of a container, extended to a lower end of the interior of the container and displaced upwardly as the container is filled. The ability to extend such lower conduit into the interior of the container and withdraw it as the level of material in the container rises maintains the outlet of the lower conduit within the container and adjacent the level of material in the container to correspondingly minimize the creation of dust and the escape of such dust through the container inlet to the ambient atmosphere.

BRIEF DESCRIPTION OF THE DRAWINGS

FIG. 1 is a side elevational view of a container filling apparatus embodying the present invention;

FIG. 2 is a view taken along line 2—2 in FIG. 1, illustrating a container supported on a frame structure and a lower end of the filler apparatus inserted through an upper inlet of the container;

FIG. 2A is a view similar to the view shown in FIG. 2, illustrating the lower end of the filler apparatus having been withdrawn from the interior of the container;

DETAILED DESCRIPTION OF AN EMBODIMENT OF THE INVENTION

Figure 3:
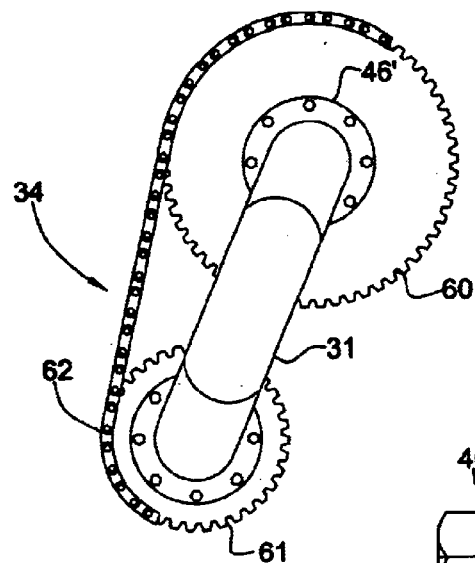
FIG. 3 is an enlarged, partial view of the portion of the filler apparatus designated by the numeral 3 in FIG. 2.

Referring to FIGS. 1 through 2A of the drawings, there is illustrated a system 10 for filling a bag 11, including a frame structure 12 for supporting bag 11 to be filled, an elevated hopper 13 holding a supply of material to be conveyed to the bag and a filler apparatus 14 supported on and communicable with hopper 13 at an upper end thereof and receivable within the bag 11 at the lower end thereof. Frame structure 12 consists of a number of components secured together into a generally rectangular configuration. Mounted on the upper end thereof is a conduit member 15 optionally provided with a solenoid operated slide valve 16 and an air vent tube 17. Bag 11 is adapted to be supported on a pallet within the frame structure, suspended from the upper end of the frame structure by means of a set of straps 19 connected to a set of suspended hangers 20. The upper end of neck portion 21 of the bag is connected to the lower end of conduit member 15 for receiving the lower end of the filler apparatus therethrough.

Figure 4:
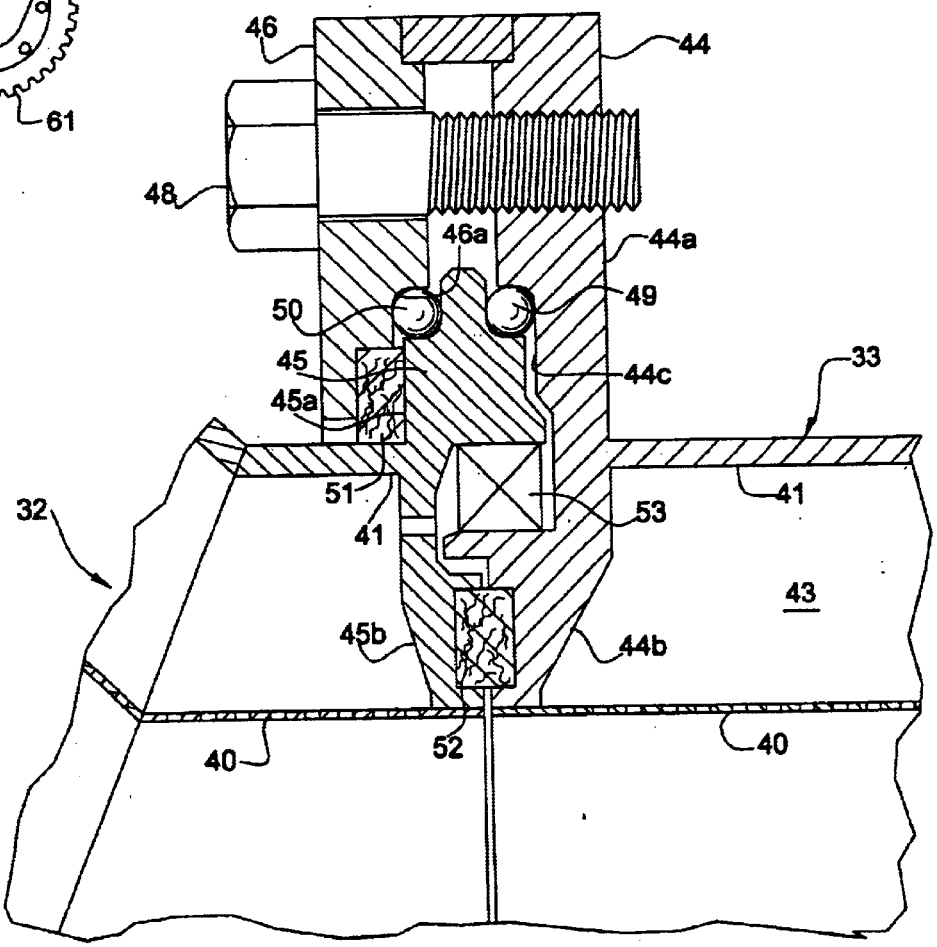
FIG. 4 is an enlarged, cross-sectional view of the swivel joint designated by the numeral 4 in FIG. 1.

Loader apparatus 14 includes an upper conduit section 30 rigidly connected at an upper end thereof to the lower end of hopper 13, a first intermediate conduit section 31 connected at its upper end to the lower end of section 30 for swivel movement relative thereto about a first axis A, a second intermediate conduit section 32 connected at an upper end thereof to a lower end of section 31 for swivel movement relative to section 31 about an axis B disposed parallel to axis A, a lower conduit section 33 connected at an upper end thereof to the lower end of section 32 for swivel movement relative thereto about at axis C disposed parallel to axis B, and a motion translating mechanism 34 operatively interconnecting upper conduit section 30 and second intermediate conduit section 32. As best shown in FIG. 4, each conduit section includes an inner tube 40 formed of a gas permeable material and an outer tube 41 formed of a gas impermeable material encompassing the inner tube, forming an inner passageway 42 and an annular chamber 43 encompassing passageway 42.

As best seen in FIG. 4, the swivel connection between conduit section 32 and conduit section 33 includes an annular portion 44 formed integrally with outer tube portion 41 of conduit 33, an annular portion 45 formed integrally with outer tube 41 of conduit section 32, an annular closure member 46, and a set of circumferentially spaced cap screws 48. Flange portion 44 includes an outer segment 44a and an inner segment 44b engaging and secured to inner tube 40 to define an end wall of annular chamber 43. The mating side of flange portion 44 is provided with an annular recess 44c. Similarly, the mating side of annular closure member 46 is provided with an annular recess 46a. Annular portion 45 includes an outer segment 45a and inner segment 45b which engages inner tube 40 of conduit section 32 and is rigidly secured thereto to define an end wall of the outer annular chamber of conduit section 32. The mating side of annular segment 45a is received within recess 44c of flange portion 44. A first set of ball bearings 49 is disposed between outer flange segment 44a and outer flange segment 45a, and a second set of ball bearings 50 is disposed between annular closure member 46 and outer flange segment 45a to permit conduit section 33 to swivel relative to conduit section 32 about axis C. Annular flange portion 44a and annular closure member 46 are secured together as shown in FIG. 4 by means of cap screws 48 extending through openings in annular closure member 46 and threaded into threaded openings in annular flange segment 44a. Disposed between flange portions 44 and 45 is a triple lip seal 51 and a felt seal 52. A felt seal 53 also is provided between annular closure member 46 and outer flange segment 45a, radially, inwardly relative to the set of ball bearings 50.

The swivel joints between conduit sections 30 and 31 and between sections 31 and 32 are similar in construction to the swivel joint shown in FIG. 4 to permit conduit section 31 to swivel relative to conduit section 30 about axis A and conduit section 32 to swivel relative to conduit section 31 about axis B. As best shown in FIG. 1, the several swivel joints lie in the same vertical plane, perpendicular to axes A, B and C.

The swivel connection between conduit section 30 and conduit section 31 is essentially a mirror image of the swivel connection shown in FIG. 4, previously described. It includes an annular portion 44' formed integrally with the outer tube portion 41 of conduit section 30, an annular portion 45' formed integrally with the outer tube 41 of conduit section 31, and annular closure member 46', a sprocket 60 and a set of circumferentially spaced cap screws 48. Flange portion 41' includes an outer segment and an inner segment engaging and secured to inner tube 40 to define an end wall of the annular chamber of conduit section 30. The mating side of flange portion 44 is provided with an annular recess. Similarly, the mating side of annular closure member 46' is provided with an annular recess. Annular portion 45' includes an outer segment and an inner segment which engages inner tube 40 of conduit section 41 and is rigidly secured thereto to define an end wall of the annular chamber of conduit section 31. The mating side of annular segment 45 is received within the recess of flange portion 44'. A first set of ball bearings 49 is disposed between an outer segment of flange portion 44' and an outer segment of flange portion 45', and a second set of ball bearings 50 is disposed between annular closure member 46' and an outer segment of flange portion of 45' to permit section 31 to swivel relative to conduit section 30 about axis A. Sprocket 60 is disposed between flange portions 44' and 46' coaxially with conduit section 31 and is secured therebetween by means of cap screws 48 extending through aligned openings in annular closure member 46' and threaded into threaded openings in the outer segment of annular flange portion 44'. Disposed between flange portions 44' and 45 is a triple seal 51 and a felt 52. A felt seal 53 also is provided between annular closure portion 46' and flange portion 45', radially inwardly relative to the set of ball bearings 49. It would be appreciated in the joint connections shown in FIG. 5, conduit section 31 is free to swivel relative to conduit section 30 and sprocket 60 firmly secured to conduit section 30, about axis A.

Figure 5:
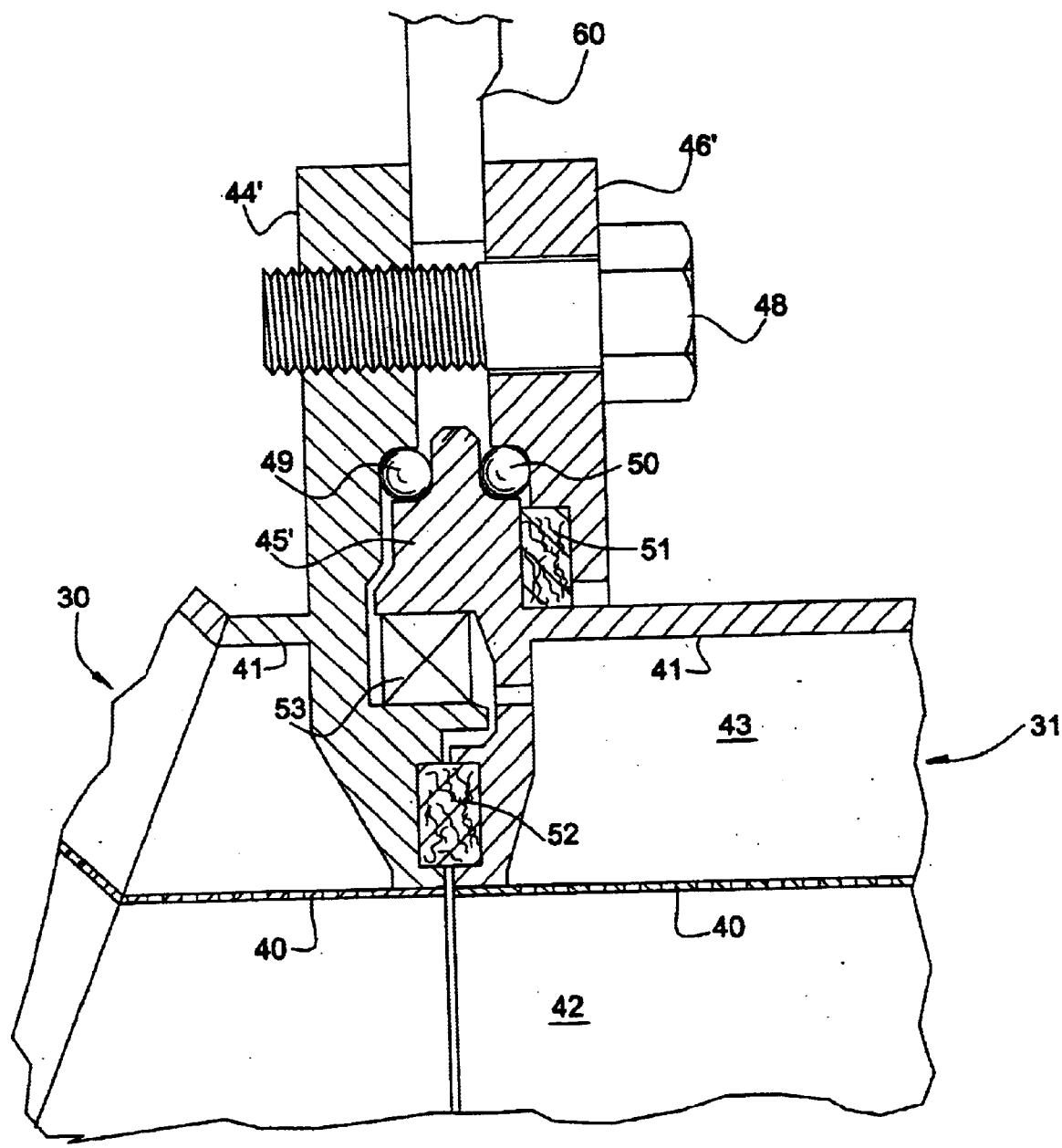
FIG. 5 is an enlarged, cross-sectional view of a portion of the swivel joint designated by the numeral 5 in FIG. 1.

The swivel connection between conduits 31 and 32 is essentially a mirror image of the connection shown in FIG. 5 which includes a sprocket 61 secured to conduit section 31. It will be appreciated that with such a connection, conduit section 14 is free to swivel relative to conduit section 31 about axis B.

Motion translating mechanism 34 consists of sprocket 60 rigidly secured to conduit section 30 coaxially with axis A, sprocket 61 rigidly secured to conduit section 32 coaxially with axis B and an endless chain 62 reeved about sprockets 60 and 61. The mechanism functions in a manner whereby whenever lower conduit section 33 is lowered or raised, conduit section 31 will be caused to swivel relative to conduit section 30 about axis A, conduit section 32 will swivel relative to conduit section 31 about axis B and conduit section 33 will swivel relative to conduit section 32 about axis C to maintain conduit 33 vertically. The number of teeth on respective sprockets 60 and 61 will vary as the relative lengths of the upper and intermediate sections are changed in each application. The drive transmitting means between sprockets 60 and 61 is not restricted to a chain as provided in the described embodiment. In addition, non-circular sprockets, cog belt pulleys or wire rope sheaves may be used to more accurately achieve linear travel of sprout 33 throughout its range of motion.

In the use of the apparatus as described for filling a bag 11 with a bulk particulate material disposed in hopper 13, valve 16 is opened to provide access to the interior of the bag, lower conduit section 33 is then inserted through valve 16, conduit 15 and into the interior of the bag adjacent the lower end thereof. A valve 70 provided at the discharge end of the hopper is then opened to permit the material to gravity flow through the main passageway provided in conduit sections 30 through 33. As the level of material in the bag rises, conduit section 33 is raised until the bag is filled and valve 70 is closed. By being able to maintain the outlet of lower conduit section 33 adjacent to the rising level of material within the bag, dust created by the flow of material into the bag is minimized and contained within the bag. The vertical displacement of lower conduit section 33 made possible by motion translating mechanism 44 permits the lower conduit section not only to be inserted into the lower portion of the interior of the bag but also to permit the discharge end thereof to be disposed in close proximity to the rising level of material in the bag. Once the bag has been filled and the lower conduit section has been removed from the interior thereof, neck portion 21 of the bag may be detached from member 15, tied and folded onto the upper end of the bag. The bag seated on a pallet then may be removed from frame structure 12 and transported to a storage area or a processing area by means of a forklift truck.

In lieu of a pallet for supporting a bag to be filled, a scale may be provided for the purpose of weighing the material being filled into the bag.

To enhance the flow of material in the main passageway of the several conduit sections, fluidizing air may be injected into annular chambers 43 to pass through the inner tubes thereof and thus facilitate the flow of material through the main passageway of the apparatus. In addition, the lower conically configured section of the material holding hopper may be provided with a perforated wall within the outer wall thereof through which air under pressure may be supplied to fluidize material flowing through the hopper and thus enhance its flow.

From the foregoing detailed description it will be evident that there are a number of changes, adaptations, modifications for the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A particulate material conveying apparatus comprising:
   an upper segment including an outer impermeable conduit and an inner, permeable conduit spaced from said outer, impermeable conduit to provide an annular plenum therebetween;
   a first intermediate segment connected to said upper segment for swivel movement relative thereto about a first axis, including an outer, impermeable conduit and an inner, permeable conduit spaced from said outer conduit to provide an annular plenum therebetween, said inner, impermeable conduit communicating with said inner, permeable conduit of said upper segment;
   a second intermediate segment connected to said first intermediate segment for swivel movement relative thereto about a second axis parallel to said first axis, including an outer impermeable conduit and an inner, permeable conduit providing an annular plenum therebetween, said inner, permeable conduit communicating with said inner permeable conduit of said first intermediate segment;
   a lower segment connected to said second intermediate segment for swivel movement relative thereto about a third axis, including an outer impermeable conduit and an inner, permeable conduit spaced from said outer conduit providing an annular plenum therebetween, said inner, permeable conduit communicating with said inner, permeable conduit of said second intermediate segment;
   means for translating the angular displacement of said second intermediate segment relative to said first intermediate segment about said second axis to the angular displacement of said first intermediate segment relative to said upper segment about said first axis under displacement of said lower conduit along a line of travel thereby maintaining said displacement of said lower conduit along said line of travel; and
   means for supplying air under pressure to at least one of said plenums.

2. An apparatus according to claim 1 wherein said upper segment is stationary.

3. An apparatus according to claim 1 wherein said upper segment is disposed vertically.

4. An apparatus according to claim 1 wherein said upper segment is disposed vertically.

5. An apparatus according to claim 1 wherein said inlet of said inner, permeable conduit of said upper segment is communicable with means holding said particulate material.

6. An apparatus according to claim 1 wherein said lower segment is displaceable along a line of travel passing through the longitudinal centerline thereof.

7. An apparatus according to claim 6 wherein said line of travel is substantially vertical.

8. An apparatus according to claim 1 wherein said outlet of said lower conduit is communicable with a receptacle.

9. An apparatus according to claim 1 wherein said translating means comprises an annular member rigidly secured to said upper segment coaxially with said first axis, an annular member rigidly secured to said second intermediate segment coaxially with said second axis and an endless member trained about said annular members.

10. An apparatus according to claim 1 wherein said translating means comprises a pulley rigidly mounted on said upper segment coaxially with said first axis, a pulley rigidly mounted on said second intermediate conduit coaxially with said second axis and an endless belt reeved about said pulleys.

11. An apparatus according to claim 1 wherein said translating means comprises a pulley rigidly mounted on said upper segment coaxially with said first axis, a pulley rigidly mounted on said second intermediate segment coaxially with said second axis and a cog drive belt reeved about said second pulley.

12. An apparatus according to claim 1 wherein said translating means comprises a sprocket rigidly mounted on said upper segment coaxially with said first axis, a second sprocket rigidly mounted on said second intermediate segment coaxially with said second axis and an endless chain trained about said sprockets.

13. A system for filling a container having an inlet with a bulk particulate material comprising:
   means for supporting said container with said inlet opening upwardly;
   means elevated relative to said supporting means for holding a supply of said material to be conveyed into said containers;
   an upper segment including an outer, impermeable conduit and an inner, permeable conduit spaced from said outer conduit to provide an annular plenum therebetween, said inner permeable conduit communicating with said holding means;
   a first intermediate segment connected to said upper segment for swivelable movement relative thereto about said first axis, including an outer, impermeable conduit and an inner, permeable conduit spaced form said outer conduit to provide an annular plenum there between, said inner, permeable conduit communicating with the inner permeable conduit of said upper segment;
   a second intermediate segment connected to said first intermediate segment for swivelable movement relative thereto about a second axis parallel to said first axis, including an outer, impermeable conduit and an inner, permeable conduit spaced from said outer, impermeable conduit to provide an annular plenum therebetween, said inner, permeable conduit communicating with the inner, permeable conduit of said first intermediate segment;
   a lower segment connected to said second intermediate segment for swivelable movement relative thereto about a third axis, including an outer, impermeable conduit and an inner, permeable conduit spaced from said outer, impermeable conduit to provide an annular plenum therebetween, and said inner, permeable conduit communicating with the inner, permeable conduit of said second intermediate segment;
   means for translating the angular displacement of said second intermediate segment relative to said first intermediate segment about said second axis to the angular displacement of said first intermediate segment relative to said upper segment about said first axis upon displacement of said lower segment along line of travel thereby maintaining said displacement of said lower conduit along said line of travel; and means for supplying air under pressure to at least one said plenums.

14. A system according to claim 1 wherein said lower segment is disposed vertically and said translating means is operable to displace said lower segment along a vertical line of travel.

15. A system according to claim 1 wherein said lower conduit has a length sufficient to allow a lower end thereof to be inserted through said inlet of said container to a position adjacent a bottom of the interior of said container.

16. A system according to claim 1 including a valve disposed between said holding means and said upper conduit segment.

17. A system according to claim 16 wherein said holding means comprises a hopper.

18. A system according to claim 17 wherein said hopper is provided with a conically-shaped bottom section, and including means for injecting air under pressure along said bottom section to fluidize material flowing therethrough.

19. A system according to claim 1 wherein said upper segment is stationary.

20. A system according to claim 1 wherein said upper segment is disposed vertically.

21. A system according to claim 1 wherein said translating means comprises a member rigidly mounted on said upper segment coaxially with said first axis, a member rigidly mounted on said second intermediate segment coaxially with said second axis and an endless member trained about said annular member.

22. A system according to claim 1 wherein said translating means comprises a pulley rigidly mounted on said upper segment coaxially with said first axis, a pulley rigidly mounted on said second intermediate segment coaxially with said second axis and an endless belt reeved about said pulleys.

23. A system according to claim 1 wherein said translating means comprises a pulley rigidly mounted on said upper segment coaxially with said first axis, a pulley rigidly mounted on said second intermediate segment coaxially with said second axis and a cog drive belt reeved about said pulleys.

24. A system according to claim 1 wherein said translating means comprises a sprocket rigidly mounted on said upper segment coaxially with said first axis, a sprocket rigidly mounted on said second intermediate segment coaxially with said second axis and an endless chain trained about said sprockets.

* * * * *

UNITED STATES PATENT AND TRADEMARK OFFICE
CERTIFICATE OF CORRECTION

PATENT NO. : 6,843,633 B2
DATED : January 18, 2005
INVENTOR(S) : John W. Pfeiffer et al.

It is certified that error appears in the above-identified patent and that said Letters Patent is hereby corrected as shown below:

Column 7,
Lines 8, 12, 16, 25 and 27, "1", each occurrence, should read -- 13 --.

Column 8,
Lines 7, 13 and 19, "1", each occurrence, should read -- 13 --.

Signed and Sealed this

Thirtieth Day of August, 2005

JON W. DUDAS
*Director of the United States Patent and Trademark Office*